(12) United States Patent
Jolly

(10) Patent No.: US 9,325,160 B2
(45) Date of Patent: Apr. 26, 2016

(54) WHILE-IN USE COVER WITH SPLASH GUARDS

(71) Applicant: Thomas & Betts International LLC, Wilmington, DE (US)

(72) Inventor: Robert Kevin Jolly, Cordova, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 134 days.

(21) Appl. No.: 14/090,743

(22) Filed: Nov. 26, 2013

(65) Prior Publication Data

US 2014/0182877 A1 Jul. 3, 2014

Related U.S. Application Data

(60) Provisional application No. 61/746,635, filed on Dec. 28, 2012.

(51) Int. Cl.
*H02G 3/14* (2006.01)
*H02G 3/08* (2006.01)

(52) U.S. Cl.
CPC ................................... *H02G 3/088* (2013.01)

(58) Field of Classification Search
USPC ................................................ 174/50, 66
See application file for complete search history.

(56) References Cited

U.S. PATENT DOCUMENTS

| | | | |
|---|---|---|---|
| 2,730,261 A | 1/1956 | Tutt | |
| 4,851,612 A * | 7/1989 | Peckham | 174/67 |
| 5,045,640 A * | 9/1991 | Riceman | 174/67 |
| 5,448,012 A | 9/1995 | Jacob | |
| 5,728,973 A | 3/1998 | Jorgensen | |
| 5,994,976 A | 11/1999 | Tang | |
| 6,127,630 A * | 10/2000 | McKenzie | H02G 3/14 174/58 |
| 6,133,531 A | 10/2000 | Hayduke et al. | |
| 7,022,912 B1 | 4/2006 | Kilburn | |
| 7,075,005 B1 | 7/2006 | Drane | |
| 7,410,372 B2 | 8/2008 | Johnson et al. | |
| 7,462,777 B2 | 12/2008 | Dinh | |
| 7,619,162 B2 | 11/2009 | Dinh et al. | |
| 8,013,245 B2 * | 9/2011 | Korcz | H02B 1/52 174/53 |
| 8,193,444 B2 | 6/2012 | Rodenberg | |
| 2011/0139482 A1 | 6/2011 | Soh et al. | |
| 2011/0240363 A1 | 10/2011 | Dinh | |
| 2012/0031640 A1 | 2/2012 | Korcz et al. | |
| 2013/0078853 A1 | 3/2013 | Dinh | |

FOREIGN PATENT DOCUMENTS

| | | |
|---|---|---|
| CA | 2073932 | 1/1995 |
| CA | 2172837 | 4/1995 |
| CA | 2203633 | 5/1996 |
| CA | 2005775 | 7/1997 |
| CA | 2210777 | 2/1998 |
| CA | 2377066 | 9/2002 |
| CA | 2092516 | 2/2003 |
| CA | ID100407 | 12/2003 |
| CA | 2459250 | 7/2007 |
| CA | 2592824 | 2/2008 |
| CA | 2454745 | 3/2009 |

(Continued)

*Primary Examiner* — Dhirubhai R Patel
(74) *Attorney, Agent, or Firm* — Hoffmann & Baron, LLP

(57) ABSTRACT

A while-in use electrical box cover is provided which includes at least one integral splash guard that covers at least one cord exit aperture for a power cord which is plugged into an electrical outlet on which the WIU electrical box cover is mounted when the WIU cover is in the closed position.

18 Claims, 6 Drawing Sheets

(56) References Cited

FOREIGN PATENT DOCUMENTS

| | | |
|---|---|---|
| CA | 2639623 | 3/2009 |
| CA | 2512407 | 5/2009 |
| CA | 2588158 | 9/2010 |
| CA | 2592787 | 9/2010 |
| CA | 2599530 | 10/2010 |
| CA | 2599528 | 3/2011 |
| CA | 2735489 | 9/2011 |
| CA | 2768124 | 9/2012 |
| CA | 2685665 | 1/2013 |
| CA | 2690900 | 3/2013 |
| WO | 2011107790 | 1/2013 |

* cited by examiner

WHILE-IN USE COVER WITH SPLASH GUARDS

FIELD OF THE INVENTION

In general, the present invention relates to while-in-use (WIU) electrical box covers. More particularly, the present invention relates to an improved design of a hood of a WIU electrical box cover which is comprised of integral splash guards to prevent the entry of water.

BACKGROUND

While-in-use electrical box covers have been in use for many years to protect outdoor electrical outlets from the harsh elements of an outdoor environment. Most while-in-use electrical box covers comprise a base and hood which are attached to one another to form the while-in-use cover. In order to allow power cords of electrical devices to be plugged in to electrical outlets with a WIU cover in the closed position, there are sometimes knockouts which are present either in the hood or base of the WIU cover that allow for passage of the power cords from the outlet and through the WIU cover. However, since these knockouts are open to the outside, water can sometimes splash off of surroundings and back into the WIU cover.

SUMMARY OF THE INVENTION

The present invention provides an integral splash guard to prevent water from entering a while-in-use cover while a power cord is plugged into an outlet which is being protected by the WIU cover. The splash guard may be present on one or more sides of the WIU cover, which allows for vertical and horizontal mounting of the WIU cover while offering protection against water which could potentially splash back into the WIU cover. The positioning of the splash guards allow for the WIU cover to be in the closed position while a power cord is plugged into an outlet.

DETAILED DESCRIPTION OF THE PREFERRED EMBODIMENT(S)

Figure 1:
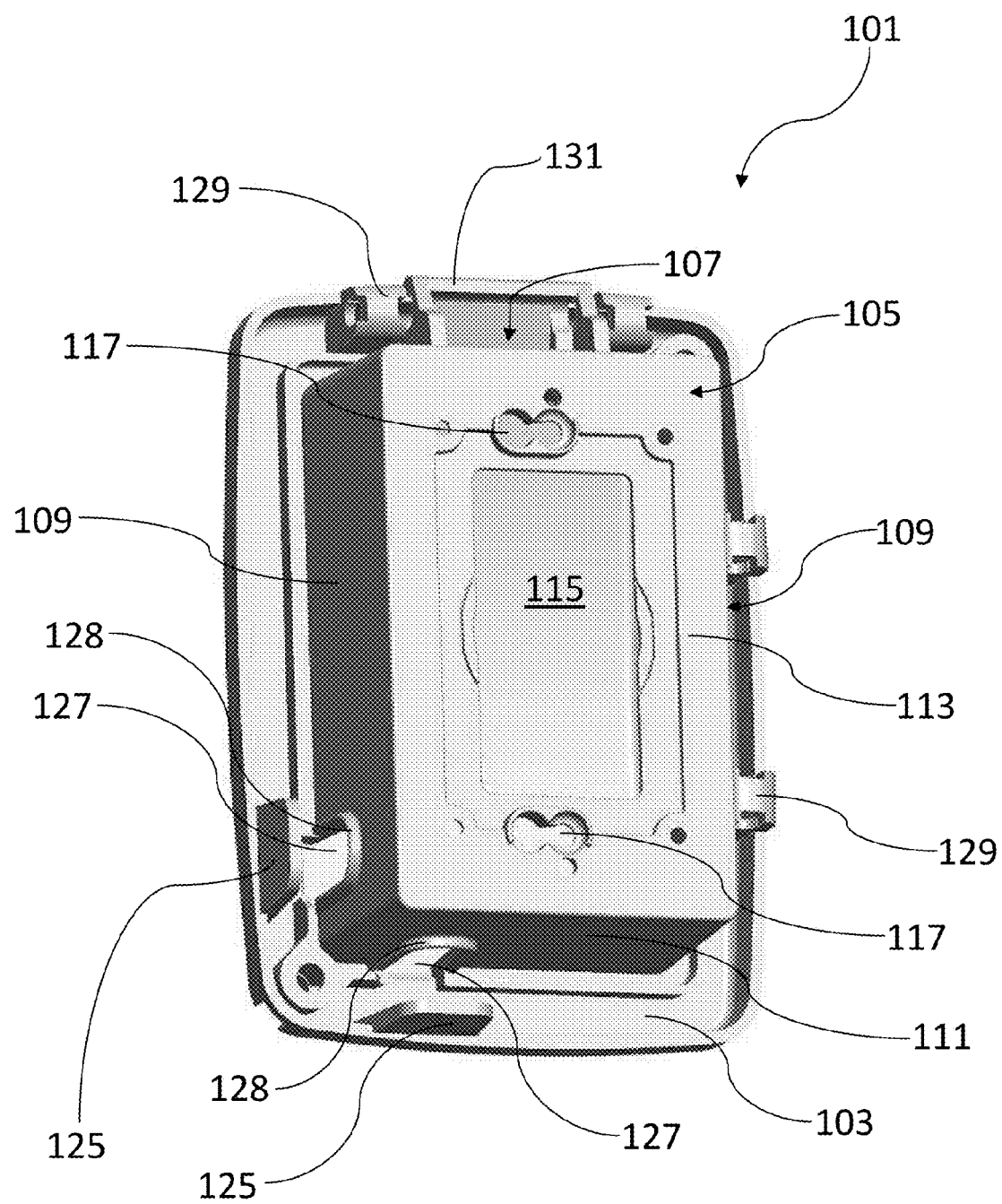
FIG. 1 is a rear perspective view of a vertically positioned while-in-use electrical box cover of the present invention.
Figure 2:
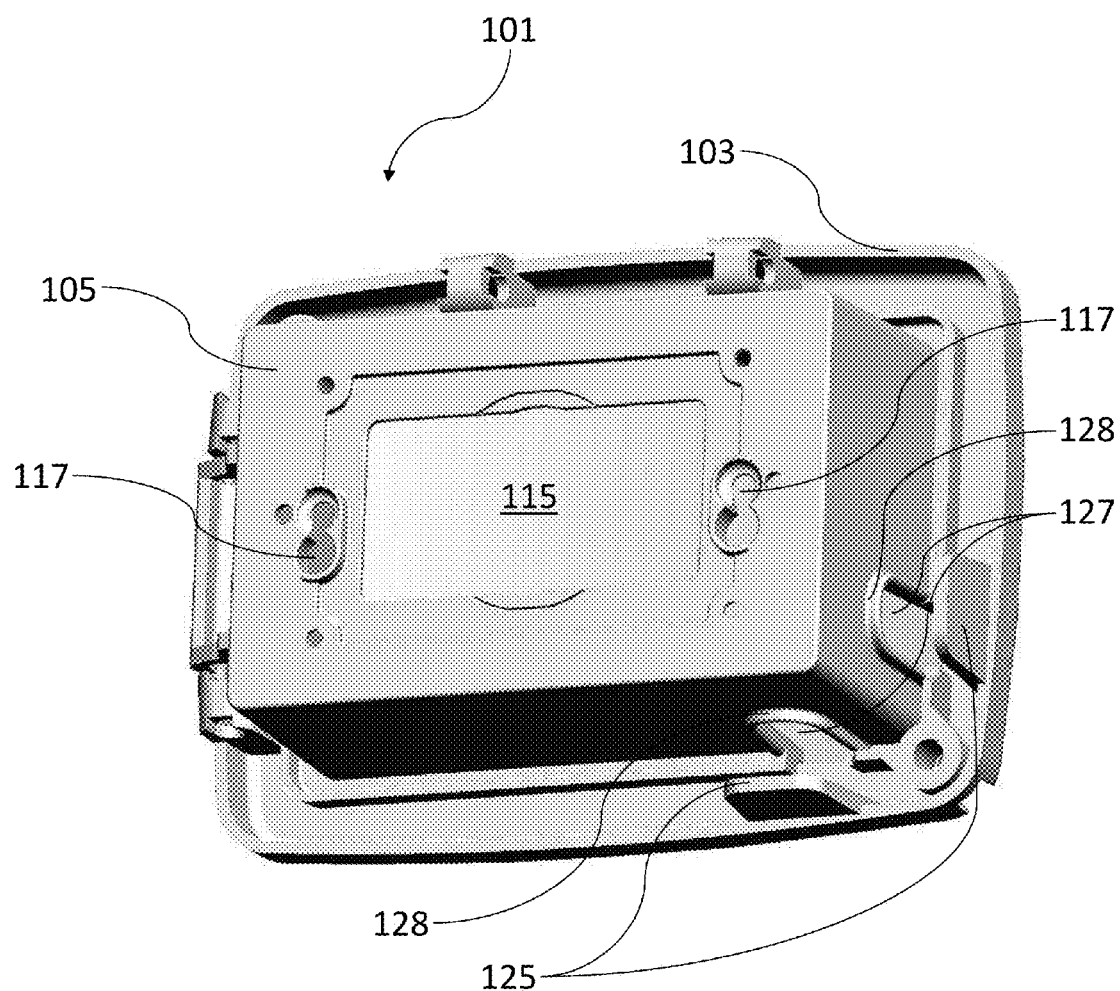
FIG. 2 is a rear perspective view of a horizontally positioned while-in-use electrical box cover of the present invention.

The above and other features, aspects and advantages of the present invention will now be discussed in the following detailed description of preferred embodiments and appended claims, which are to be considered in conjunction with the accompanying drawings in which identical reference characters designate like elements throughout the views.

Figure 6A:
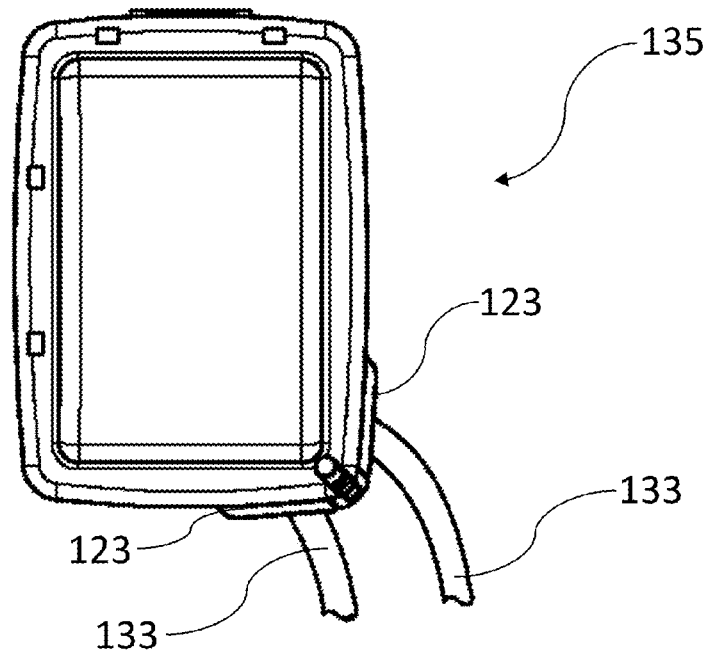
FIG. 6A is a front elevation view of a vertically positioned while-in-use electrical box cover of the present invention.
Figure 6B:
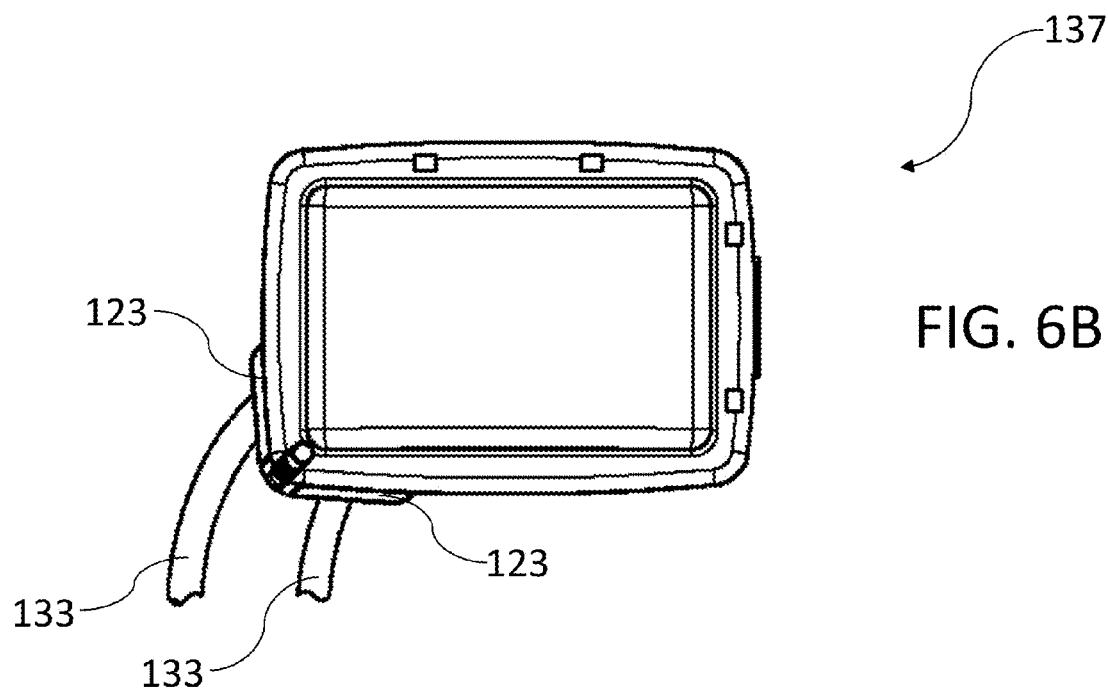
FIG. 6B is a front elevation view of a horizontally positioned while-in-use electrical box cover of the present invention.

Shown in FIG. 1 is a rear perspective view of a vertically positioned while-in-use electrical box cover 101 of the present invention. The WIU cover is comprised of a hood 103 and a base 105. The hood 103 and base 105 are connected via a hood hinge 129 and base hinge 131 which form a hinge connection. In FIG. 1, the hinge connection is located on both a top wall 107 and side wall 109 of the WIU cover, but it is understood that the hinge connection may be located on any side, or any combination of sides, of the WIU cover, such as the side wall 109 and bottom wall 111 of the base 105. These multiple positions of the hood hinge 129 and base hinge 131 allow for both vertical mounting 135 and horizontal mounting 137 of the WIU cover, which is illustrated in FIGS. 6A and 6B, respectively. The WIU cover 101 mounts onto an outlet by way of the mounting apertures 117, in which screws can be inserted through the mounting apertures 117 and into similar apertures located on an outlet in order to secure the WIU cover 101 onto the outlet, which is thereby accessed through the outlet aperture 115 which is located in a rear wall 113 of the WIU cover 101.

Shown in FIGS. 1-5 are cord exit apertures 127 of the WIU cover 101 which allow for passage of power cords 133, such as those shown in FIGS. 6A and 6B, through the WIU cover when the hood 103 of the WIU cover is in the closed position. In FIGS. 1-5, the positioning of the cord exit apertures 127 on the base 105 of the WIU cover 101 is such that the cord exit apertures are at a 90 degree angle to one another and located on different walls of the base 105. This kind of spacing is preferred so that two power cords may be plugged into an outlet which is being protected by the WIU cover when the WIU cover 101 is mounted in either a horizontal or vertical orientation. However, it is understood that different positioning of the cord exit apertures 127 on the base 105 may be used and that more or less than the two cord exit apertures 127 which are illustrated in FIGS. 1-5 may be used. FIGS. 1-4 show a feature of the cord exit aperture 127, and that feature is rounded edges 128 of the cord exit aperture 127. The rounded edges 128 are useful because they are not sharp, and therefore, will not cut into the jacket of the electrical cord which is plugged into an outlet being protected by the WIU cover 101. The rounded edges 128 also prevent cords from kinking at the cord exit apertures 127.

Shown in FIGS. 1-4 are integral splash guards 125. The splash guards are integral components of the hood 103 of the WIU cover 101. From FIGS. 1-4, it can be seen that the splash guards 125 are aligned with the cord exit apertures 127 so that the splash guards 125 are positioned over the cord exit apertures 127 when the hood 103 of the WIU cover 101 is in the closed position. The splash guards 125 prevent water from splashing into the WIU cover 101 and contacting the electrical outlet device which is housed within the WIU cover 101 when the WIU cover 101 is mounted on an electrical outlet device. The splash guards serve this purpose regardless if power cords are plugged into the electrical outlet or not. To allow for the power cords 133, such as shown in FIGS. 6A and 6B, to easily exit the WIU cover 101 by way of the cord exit apertures 127, the splash guards 125 are parallel to and offset from the cord exit apertures 127 when the hood 103 of the WIU cover 101 is in the closed position. The splash guards 125 are located on edges of the hood 103, which allows enough space for the power cords to exit the base 105 of the WIU cover 101 through the cord exit apertures 127. In FIGS. 1-4, there are two cord exit apertures 127 with two corresponding splash guards 125 shown as a part of the WIU cover 101. It is understood that there may be more or fewer cord exit apertures and splash guards, but it is preferred that there be at least as many splash guards as there are cord exit apertures so that each cord exit aperture, and, ultimately, the electrical outlet device housed within the WIU cover, is protected from splashing water by a splash guard. It is also preferred that the splash guards 125 are sized such that they completely cover their corresponding cord exit apertures 127. It is understood that the splash guards 125 and the cord exit apertures 127 can be a variety of shapes while successfully performing this function.

Figure 3:
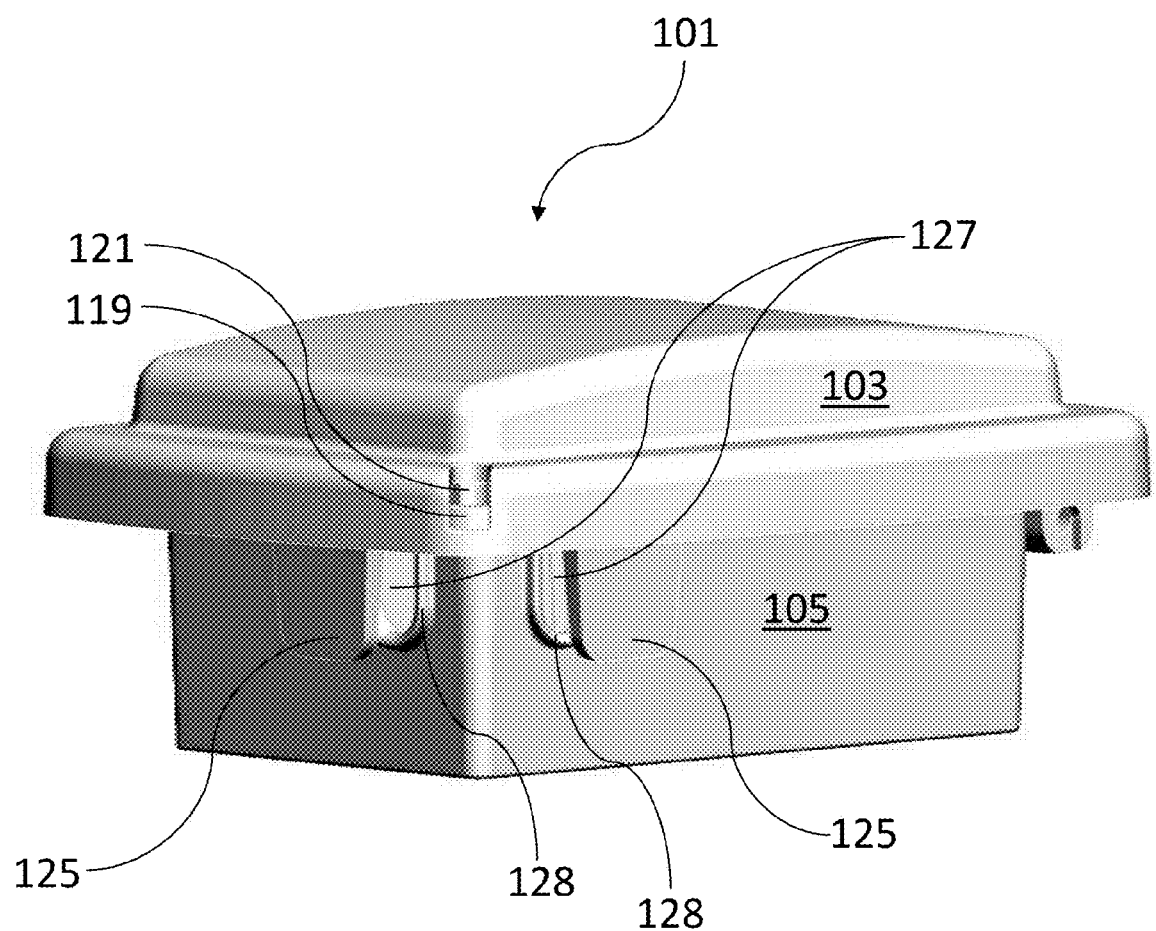
FIG. 3 is a side perspective view of a while-in-use electrical box cover of the present invention.
Figure 4:
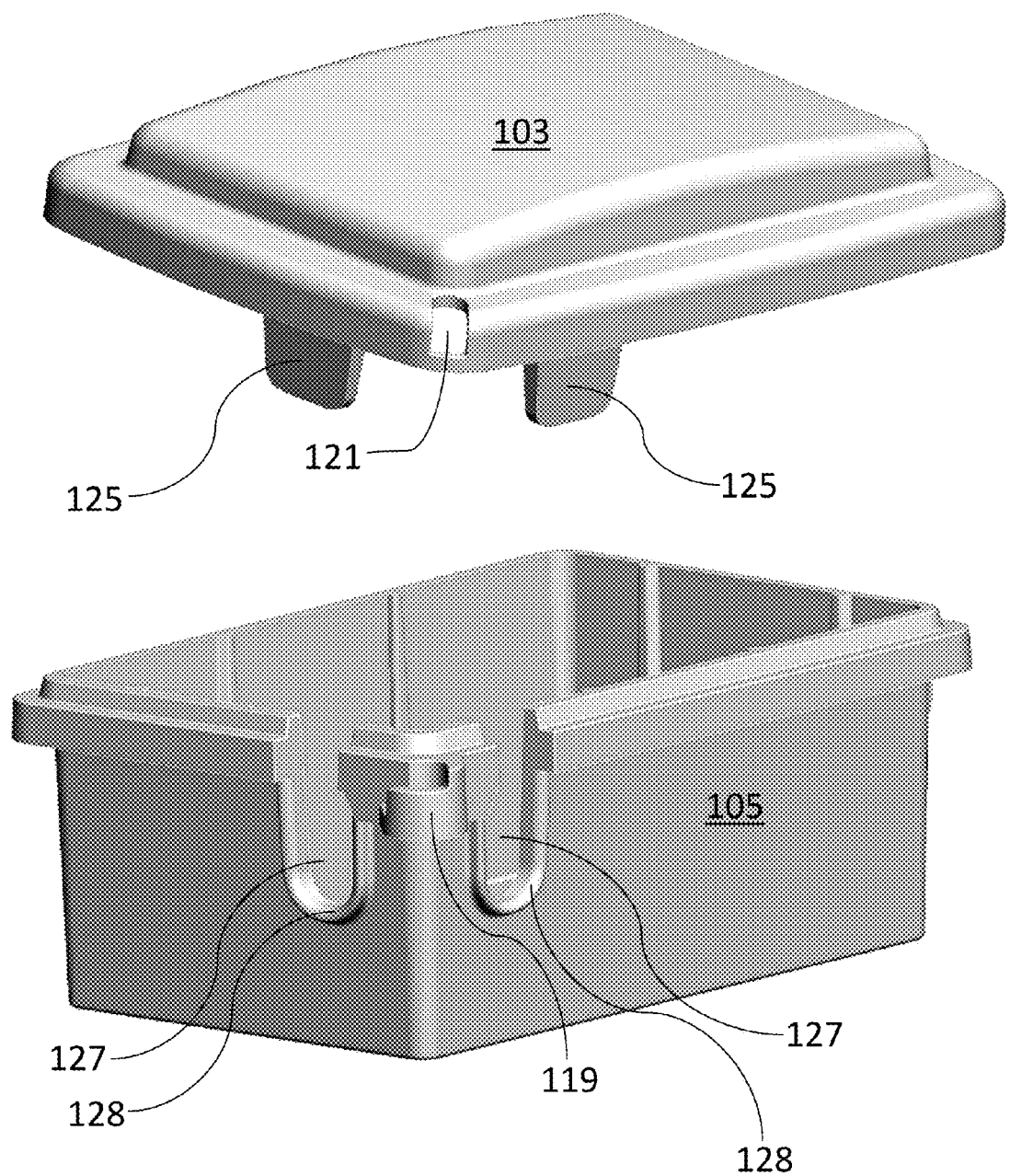
FIG. 4 is a side perspective exploded view of a while-in-use electrical box cover of the present invention.
Figure 5:
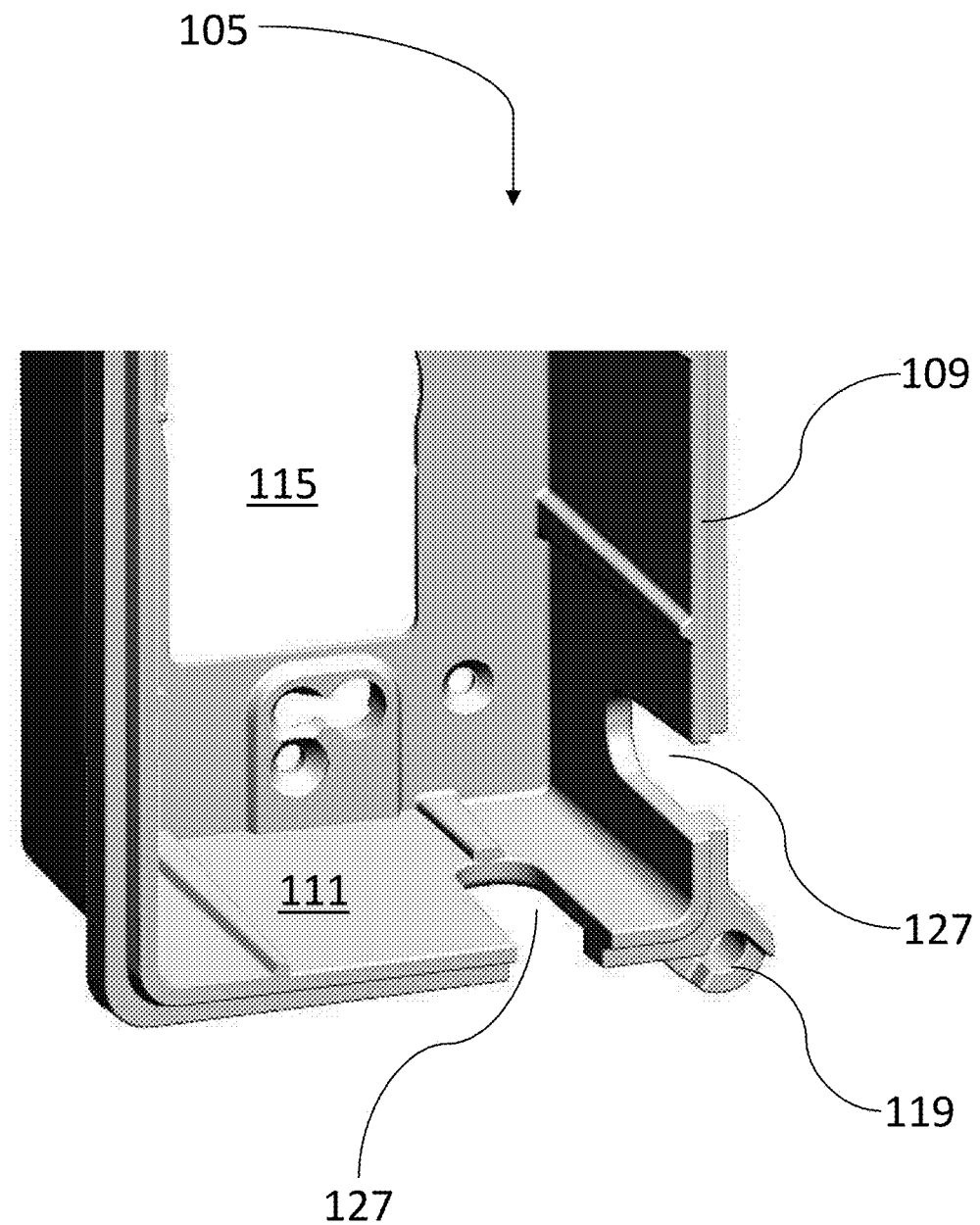
FIG. 5 is a close-up view of exit apertures for a power cord of a while-in-use electrical box cover of the present invention.

Another feature of the WIU cover 101 is the base latch 119 and hood latch aperture 121 which are shown in FIGS. 3 and 4, with the base latch 119 also shown in FIG. 5. The exploded view of the WIU cover in FIG. 4 shows a clearer view of the base latch 119 and the hood latch aperture 121. When the hood 103 of the WIU cover 101 is in the closed position, the hood latch aperture 121 engages with the base latch 119 so that the hood 103 will remain in the closed position until an operator intentionally lifts the hood 103 into the open position. Even though only one base latch 119 and hood latch aperture 121 are shown in FIGS. 3 and 4, it is understood that more or less base latches and hood latch apertures may be formed as a part of the WIU cover 101 and may be located at a variety of positions on the WIU cover 101. To assist an operator in lifting the hood 103 so that it is in the open position, one or more hood lift tabs 123, such as shown in FIGS. 6A and 6B, may be formed as part of the hood 103 of the WIU cover 101. These hood lift tabs 123 protrude from the hood 103 and can be located on multiple sides of the hood 103 so that the hood 103 of the WIU cover 101 can be easily opened, regardless of if the WIU cover 101 has been mounted in the vertical position 135 or horizontal position 137, as shown in FIGS. 6A and 6B, respectively.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:

1. A while-in-use electrical box cover such that a power cord can remain plugged into an electrical outlet during use and for preventing entry of water into the cover, comprising:
    a base, a rear wall containing an aperture for receiving an electrical outlet, two sidewalls, a top wall, and a bottom wall, wherein the sidewalls, top wall and bottom wall all parametrically bound the rear wall and wherein at least one of the walls of the base comprise at least one cord exit aperture for the power cord;
    a hood which is attached to the base, the hood having an open position and a closed portion;
    at least one splash guard attached to the hood; and
    wherein when the hood of the cover is in the closed position, the at least one splash guard is located such that it is parallel to and offset from the at least one cord exit aperture for the power cord such that the at least one splash guard prevents water from entering the at least one cord exit aperture.

2. The while-in-use electrical box cover of claim 1, wherein the hood integrally comprises at least as many splash guards as there are cord exit apertures in the base and wherein the splash guards protrude from an edge of the hood and are perpendicular to the plane in which the hood lies.

3. The while-in-use electrical box cover of claim 1, wherein the base comprises a latch on at least one corner of the base and the hood comprises a latch aperture on at least one corner of the hood which corresponds to the latch located on the base, and wherein the latch on the base and the latch aperture on the hood engage with one another when the hood is in the closed position to keep the hood securely closed.

4. The while-in-use electrical box cover of claim 1, wherein there are at least two cord exit apertures for two power cords and at least two splash guards for covering those two cord exit apertures, with the cord exit apertures and corresponding splash guards being located on adjacent sides of the cover such that the cord exit apertures and corresponding splash guards are 90 degrees apart.

5. The while-in-use electrical box cover of claim 1, wherein the hood of the cover comprises at least one hood lift tab on a side of the hood which allows for easy lifting of the hood.

6. The while-in-use electrical box cover of claim 1, wherein the at least one splash guard covers the entire surface area of the cord exit aperture.

7. The while-in-use electrical box cover of claim 1, wherein the at least one cord exit aperture further comprises rounded edges which protrude outward from the at least one cord exit aperture and which will not cut into a jacket that protects the power cord and will prevent the cord from kinking at the cord exit aperture.

8. A while-in-use electrical cover box cover such that a power cord can remain plugged into an electrical outlet during use and for preventing entry of water into the cover, comprising: a base, the base comprising at least one hinge mourn, a rear wall containing an aperture for receiving an electrical outlet, two sidewalls, a top wall, and a bottom wall, wherein the sidewalls, top wall and bottom wall all parametrically bound the rear wall and wherein at least one of the walls of the base comprise at least one cord exit aperture for the power cord; a hood which is attached to the at least one base hinge mount via at least one hinge connection, the hood having an open position and a closed position; at least one splash guard attached to the hood; wherein when the hood is in the closed position, the at least one splash guard is located such that it is parallel to and offset from the at least one cord exit aperture and covers the surface area of the at least one cord exit aperture for the power cord and prevents water from entering the at least one cord exit aperture; and wherein the hood integrally comprises at least as many splash guards as there are cord exit apertures in the base and wherein the splash guards protrude from an edge of the hood and are perpendicular to the plane in which the hood lies.

9. The while-in-use electrical box cover of claim 8, wherein there are at least two cord exit apertures for two power cords and at least two splash guards for covering those two cord exit apertures, with the cord exit apertures and corresponding splash guards being located on adjacent sides of the cover such that the cord exit apertures and corresponding splash guards are 90 degrees apart.

10. The while-in-use electrical box cover of claim 8, wherein the at least one base hinge mount is at least two base hinge mounts which can connect to the hood via at least two hinge connections being located on adjacent sides of the cover which are 90 degrees apart such that the cover can be mounted in a vertical or horizontal position.

11. The while-in-use electrical box cover of claim 8, wherein the at least one splash guard which covers the at least one cord exit aperture for the power cord may be any shape and does not have to be similar in shape to the cord exit aperture but covers the entire surface area of the cord exit aperture.

12. The while-in-use electrical box cover of claim 8, wherein the at least one cord exit aperture further comprises rounded edges which protrude outward from the at least one cord exit aperture and which will not cut into a jacket that protects the power cord and will prevent the cord from kinking at the cord exit aperture.

13. A while-in-use electrical cover box cover such that a power cord can remain plugged into an electrical outlet during use and for preventing entry of water into the cover, comprising:
- a base, the base comprising at least one hinge mount, a rear wall containing an aperture for receiving an electrical outlet, two sidewalls, a top wall, and a bottom wall, wherein the sidewalls, top wall and bottom wall all parametrically bound the rear wall and wherein at least one of the walls of the base comprise at least one cord exit aperture for the power cord;
- a hood which is attached to the at least one base hinge mount via at least one hinge connection, the hood having an open position and a closed position;
- at least one splash guard attached to the hood;
- wherein when the hood is in the closed position, the at least one splash guard is located such that it is parallel to and offset from the at least one cord exit aperture for the power cord and covers the surface area of the at least one cord exit aperture for the power cord while the hood is in the closed position and the at least one splash guard prevents water from entering the at least one cord exit aperture; and
- wherein the hood comprises at least one hood lift tab on a side of the hood which allows for easy lifting.

14. The while-in-use electrical box cover of claim 13, wherein the hood integrally comprises at least as many splash guards as there are cord exit apertures in the base and wherein the splash guards protrude from an edge of the hood and are perpendicular to the plane in which the hood lies.

15. The while-in-use electrical box cover of claim 13, wherein the base comprises a latch on at least one corner of the base and the hood comprises a latch aperture on at least one corner of the hood which corresponds to the latch located on the base, and wherein the latch on the base and the latch aperture on the hood engage with one another when the hood is in the closed position to keep the hood securely closed.

16. The while-in-use electrical box cover of claim 13, wherein there are at least two cord exit apertures for two power cords and at least two splash guards for covering those two cord exit apertures, with the cord exit apertures and corresponding splash guards being located on adjacent sides of the cover such that the cord exit apertures and corresponding splash guards are 90 degrees apart.

17. The while-in-use electrical box cover of claim 13, wherein the at least one base hinge mount is at least two base hinge mounts which can connect to the hood via at least two hinge connections being located on adjacent sides of the cover which are 90 degrees apart such that the cover can be mounted in a vertical or horizontal position.

18. The while-in-use electrical box cover of claim 13 wherein the at least one cord exit aperture further comprises rounded edges which protrude outward from the at least one cord exit aperture and which will not cut into a jacket the protects the power cord and will prevent the cord from kinking at the cord exit aperture.

* * * * *